Sept. 20, 1966 YUTAKA OKINAKA ETAL 3,274,028
MANUFACTURE OF NICKEL ELECTRODES
Filed Jan. 7, 1965
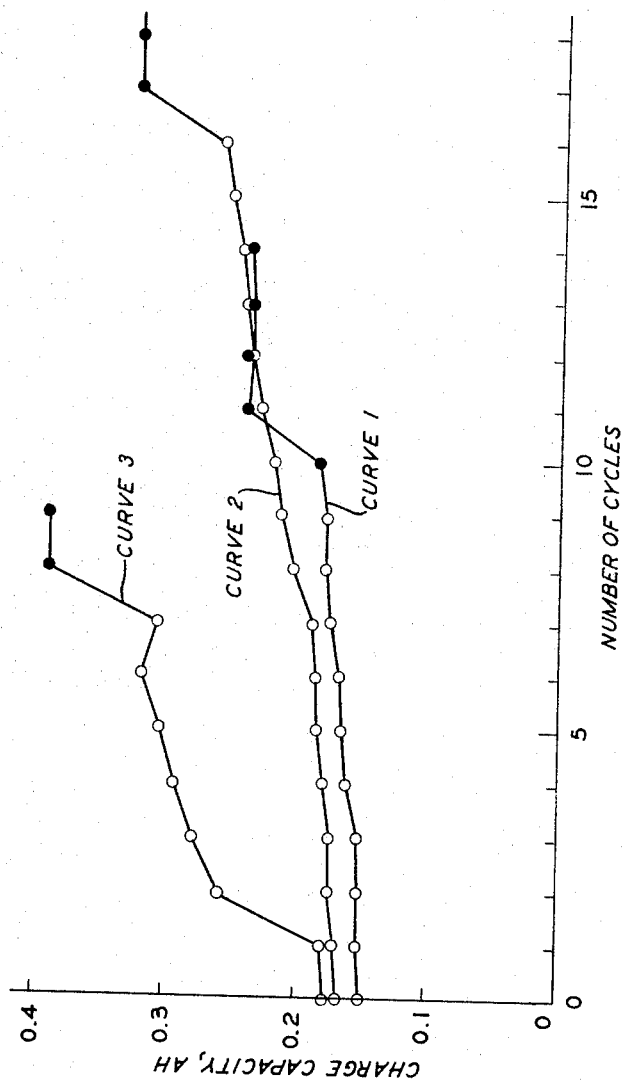
INVENTORS Y. OKINAKA
BY D. R. TURNER
ATTORNEY United States Patent Office 3,274,028
Patented Sept. 20, 1966

3,274,028
MANUFACTURE OF NICKEL ELECTRODES
Yutaka Okinaka, Madison, and Dennis R. Turner, New Providence, N.J., assignors to Bell Telephone Laboratories, Incorporated, New York, N.Y., a corporation of New York
Filed Jan. 7, 1965, Ser. No. 424,072
8 Claims. (Cl. 136—29)

This invention relates to the manufacture of nickel electrodes for nickel-cadmium batteries. More specifically, it is directed to a method for substantially increasing the ampere-hour capacity of foraminous nickel electrodes.

Anodes for nickel-cadmium cells are conventionally made by sintering together a mass of nickel particles and activating the electrode by precipitating nickel hydroxide into the pores of the sintered body. The forming operation is typically achieved by impregnating the sinter with a soluble nickel salt, usually nickel nitrate, and thereafter immersing the impregnated sinter in sodium or potassium hydroxide to precipitate the active material directly into the pores of the electrode structure. This precipitation step is customarily repeated to obtain the maximum amount of active material in the electrode. However, the capacity of the battery is determined by the surface area of the active material and as the amount of nickel hydroxide in the electrode accumulates the pores fill and the potential active surface area is reduced. Thus the amount of capacity obtainable by this technique is limited.

A technique has now been found whereby the capacity of a conventionally formed electrode can be significantly increased. It is also effective for obtaining a high capacity electrode from an anode plate which is partially activated in the conventional way.

According to the invention a sintered nickel electrode is treated in the usual manner to form nickel hydroxide on the porous nickel surface. The electrode is then cycled in a carbonate solution according to the conditions prescribed herein. The resulting electrode exhibits a higher amper-hour capacity as a result of the carbonate treatment.

The improvement evidenced by electrodes treated according to the invention is attributed to a more efficient mechanism for obtaining active material in the sinter without limiting the active surface area. It is believed that the formation of active material according to this invention is more uniform and takes place over the entire available surface area of the sinter. This results from the fact that the nickel for the active nickel hydroxide is derived from the sinter itself and a portion of the active material is formed in situ by corrosion of the surface of the nickel particles in the carbonate solution. The mechanism is believed to be:

      (1)
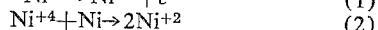      (2)
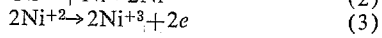      (3)
over-all
      (4)

It is seen that trivalent nickel is required for Equation 1. For this reason, some active material (ionized nickel) must be initially provided in the sinter. It is evident that the reactive mechanism regenerates trivalent nickel so that the amount orginally provided may be only a fraction of that existing in the final product. In some cases it may be found advantageous to restrict the amount of active material where it is formed as the result of conventional chemical precipitation to insure that occlusion of pores due to excessive localized precipitation is avoided. Also it has been found that the process described herein is effective in providing a substantial increase in capacity for plates which have already been formed for maximum capacity by chemical precipitation of active material and by other techniques of the prior art.

The details of the process, the appropriate conditions and typical results are given in the following detailed description. In the drawing:

The figure is a plot of the electrode capacity versus the number of treatment cycles evidencing the increase in ampere-hour capacity for three electrodes treated in accordance with the invention.

Sintered nickel plaques having dimensions of 2¼ inches x 1 inch x 30 mils and 80 percent porosity were activated in the conventional way. The activating procedure is of consequence only insofar as an appreciable amount of nickel hydroxide is made available in the sinter. In this particular procedure the plaques were treated with 4 molal $Ni(No_3)_2$ and made cathode for fifteen minutes in 5 N KOH. The current was approximately 5 amperes/plaque ($\sim$1 amp/in.$^2$).

The activated plaques were then cycled in $K_2CO_3$. The normality of the $CO_3^=$ is preferably between 1 and 8. In dilute solutions the high electrolyte resistance causes undesirable heating while in strong solutions (near saturation) the improvement in capacity is less profound. The cation is not important and sodium carbonate, while less soluble, is also suitable.

A cycle is prescribed as a complete discharge, in which essentially all the trivalent nickel is reduced to divalent nickel, and a charge and overcharge period. The discharge is assumed to be complete when the cell potential reaches one volt. The charge and discharge rate is preferably maintained within the range ½C to 2C, where the C rate is equal to the ratio of the current drawn or applied, to the ampere-hour capacity. The charge portion of the cycle is maintained for a period sufficient to provide an overcharge. This is required since the reaction (1), which initiates the corrosion mechanism, occurs primarily after the nickel ions are fully charged to the trivalent state. A small overcharge, of the order of 25 percent, is required to achieve a full charge since the conversion efficiency is less than 100 percent. Beyond this it is necessary to apply an additional overcharge to effect the reactions (1) and (2). It has been found that an overcharge in the range of 0.5 to 5 times capacity provides beneficial results. Prolonged overcharge, without cycling, results in degradation of the electrode.

Most effective results have been obtained with several cycles in the carbonate solution. The number of cycles, the duration of each cycle and the charge rate can all be varied within wide limits to achieve the desired purpose. Also, the temperature of the carbonate solution during cycling has a large effect on the rate of corrosion of the nickel electrode (reactions (1) and (2)).

Certain of these aspects are suggested by FIG. 1. Here the charge capacity (ordinate) is plotted against the number of cycles for three exemplary runs.

Electrode plates which had been previously activated were cycled in 6.9 N $K_2CO_3$ (cycles in $K_2CO_3$ are indicated by circles) and thereafter in 6.9 N KOH (cycles in KOH are indicated by solid dots). The capacity was measured after each cycle. The charge and discharge current was 200 ma. and the cycle duration was four hours. Consequently for the three plates shown the initial charge rate was approximately the C rate. The overcharge for the first cycle is between three and four times capacity. As the plate capacity increases both the charge rate and the overcharge decrease since the cycle time in constant.

Curve 1 gives data for a plate cycled nine times in $K_2CO_3$ at 25° C. A modest increase in capacity is seen during this treatment. The electrode was then cycled in KOH for five cycles, indicated by the solid dots. It is seen that a large capacity increase is realized during the first two cycles in KOH. The total capacity increase was 58 percent. This behavior is explained by the fact that reactions (1) and (2) occur in the carbonate solution, but reaction (3) is slow. By cycling in KOH reaction (3) is promoted. It is theorized that the nickel ion species formed as the result of reaction (2) is relatively inactive in the room-temperature carbonate solution. Consequently the dramatic change is seen only after the KOH cycle.

Curve 2 in the figure gives similar data for a plate cycled sixteen times in $K_2CO_3$ at 25° C. and then twice in KOH. The additional overcharge cycles in carbonate produced a greater over-all increase in ampere-hour capacity, in this case 84 percent.

Curve 3 gives similar data for an electrode cycled in $K_2CO_3$ in the same way except that the carbonate solution was heated to 55° C. It is evident that the corrosion mechanism proceeds much more rapidly at elevated temperatures. Here a sizeable increase in capacity is noted during the carbonate cycles indicating an increase in the activity of the nickel ion species produced in reaction (2). The overall increase is 120 percent.

It is apparent that effective increases in capacity can be achieved in shorter periods by using elevated temperatures. The only known limitation on the maximum useful temperature is the normal boiling point of the solution ($\sim$ 100° C.). From the figure it is evident that, at temperatures much above room temperature, a single cycle gives a significantly improved electrode capacity.

The cycle time should be such as to wholly discharge and charge the electrode and then overcharge the electrode by an amount of at least 50 percent of its ampere-hour capacity, as discussed previously. At a charge-discharge rate of ½ C (the minimum previously prescribed), the cycle time should be at least five hours. At a rate of 2 C the discharge-charge time requires approximately one hour and an overcharge of five times capacity requires that the cycle take no more than approximately three and one-half hours. The cycle time can be related to the charge rate, irrespective of the plate capacity and charge/discharge current, by the expression $$TC = 2.5 \text{ to } 7$$

where C is the ratio of charge/discharge current to plate capacity and varies from ½ to 2.

Considering a cycle to be defined by the limits prescribed at least one cycle is necessary where the carbonate electrolyte is heated to a temperature above 45° C. Below 45° C., and particularly at room temperature, at least five cycles are recommended.

As indicated previously the initial forming step is not critical as long as a quantity of $Ni(OH)_2$ or NiOOH is available before the carbonate treatment. The active material ($Ni(OH)_2$) can be obtained by several known techniques such as immersing the sinter in a solution containing a soluble nickel salt and thereafter precipitating $Ni(OH)_2$ by treatment in a hydroxide solution. Electrolytic precipitation can also be used, as well as direct impregnation by immersing the sinter in fused $Ni(OH)_2$.

A preferred method for forming an appreciable amount of $Ni(OH)_2$ into the pores of the sinter is by the following technique.

The sintered nickel plaques are made anodic in a 4 molal solution of $Ni(NO_3)_2$. The cathodes are flat sheets spaced evenly from the plaque surface so as to insure a uniform current density over the entire plaque surface. The anode current density is adjusted to approximately 1 ampere/in.$^2$ and $Ni(OH)_2$ is anodically precipitated into the nickel sinter. Effective results are obtained after approximately five minutes of electrolysis.

Other soluble nickel salts can be used in lieu of $Ni(NO_3)_2$. The $Ni^{+2}$ concentration should be in the range of 0.1 M to 6 M. Current densities in the range 0.05 to 5 amperes/in.$^2$ have been found effective.

This forming step is given for the purpose of presenting a preferred embodiment. However other forming methods such as those previously mentioned have been used successfully in combination with the carbonate treatment to produce battery electrodes with high capacity.

Generally the amount of nickel hydroxide introduced in the forming step prior to corrosion in the carbonate solution is 0.3 to 0.5 gm. $Ni(OH)_2$ per gram of nickel. However, a useful lower limit is approximately 0.1 gram $Ni(OH)_2$ per gram of nickel. The maximum amount of hydroxide is generally felt to be approximately one-half of the electrode volume. On a weight basis, a highly porous structure should not be filled beyond twice its weight with $Ni(OH)_2$.

A complete cycle is considered to include a complete discharge and a complete charge and overcharge under the conditions defined or any equivalent thereof. The cycle in KOH, which, as indicated by the figure, effects a large portion of the beneficial result, can be accomplished on the plaque prior to assembly into the finished cell. Alternatively, the electrode, after the carbonate treatment can be assembled in the cell and the finished product can be cycled to obtain the total capacity increase. The electrode should be considered to have an improved ampere-hour capacity after the carbonate treatment, and without a specific KOH cycle, since cycling in KOH is an unavoidable consequence of ordinary use.

Various additional aspects of the invention will become apparent to those skilled in the art. All such variations and deviations which basically rely on the teachings through which this invention has advanced the art are properly considered within the spirit and scope of this invention.

What is claimed is:

1. A method for activating a foraminous nickel electrode which comprises impregnating the electrode with nickel hydroxide, immersing the electrode in a carbonate solution having a carbonate normality in the range 1 N to 8 N and cycling the electrode through complete discharge, complete charge and overcharge prescribed by the following:

$$TC = 2.5 \text{ to } 7$$

where T is the time of the cycle in hours and C is the ratio of charge-discharge current to electrode capacity and C varies from ½ to 2.

2. The method of claim 1 wherein the carbonate solution is heated to a temperature in excess of 45° C.

3. The method of claim 1 wherein the electrode is cycled through a plurality of cycles.

4. A method for activating a foraminous nickel electrode which comprises impregnating the electrode with nickel hydroxide, immersing the electrode in a warm solution of potassium carbonate having a normality in the range 1 N to 8 N, and a temperature of approximately 55° C., and cycling the electrode at an ampere rate approximately numerically equal to the ampere hour capacity of the electrode through complete discharge, complete charge and overcharge for a cycle duration of approximately four hours.

5. The method of claim 4 wherein the solution is approximately 6.9 N $K_2CO_3$.

6. The method of claim 4 wherein the electrode is impregnated by immersing the electrode in 4 M $Ni(NO_3)_2$ and cathodically treating the electrode in 5 N KOH at a current density of approximately 1 amp/in.$^2$ to precipitate $Ni(OH)_2$ in the pores of the electrode.

7. A method for activating a porous nickel electrode which comprises electrolyzing the nickel electrode as anode in a nickel salt solution having a concentration of 0.1 M to 6 M, the anode current density being in the range 0.05 amp/in.$^2$ to 5.0 amp/in.$^2$ to anodically precipitate $Ni(OH)_2$ in the pores of the sinter and thereafter electrolytically cycling the electrode in a carbonate solution the solution having a carbonate normality in the range of 1 N to 8 N and the cycle comprising a complete discharge, charge and overcharge prescribed by the relationship:

$$TC = 2.5 \text{ to } 7$$

where T is the time of the cycle and C is the ratio of charge-discharge current to electrode capacity and C varies from ½ to 2.

8. The method of claim 7 wherein the nickel salt solution is 4 M $Ni(NO_3)_2$, and the anode current density is approximately 1 amp/in.²

References Cited by the Examiner

UNITED STATES PATENTS

| 2,737,541 | 3/1956 | Coolidge | 136—28 |
| 3,041,388 | 6/1962 | Fukuda et al. | 136—29 |

WINSTON A. DOUGLAS, *Primary Examiner.*

A. SKAPARS, *Assistant Examiner.*